(12) United States Patent  
Göbel et al.

(10) Patent No.: US 8,154,545 B2  
(45) Date of Patent: Apr. 10, 2012

(54) METHOD FOR PRODUCING TECHNICAL DRAWINGS FROM 3D MODELS WITH AT LEAST TWO COLLIDING 3D BODIES

(75) Inventors: Manfred Göbel, Göppingen (DE); Hans-Ulrich Becker, Herrenberg (DE); Jochen Dürr, Ehningen (DE)

(73) Assignee: Parametric Technology Corporation, Needham, MA (US)

( * ) Notice: Subject to any disclaimer, the term of this patent is extended or adjusted under 35 U.S.C. 154(b) by 520 days.

(21) Appl. No.: 11/792,478

(22) PCT Filed: Dec. 6, 2005

(86) PCT No.: PCT/EP2005/013057  
§ 371 (c)(1), (2), (4) Date: Jun. 27, 2008

(87) PCT Pub. No.: WO2006/061185  
PCT Pub. Date: Jun. 15, 2006

(65) Prior Publication Data  
US 2009/0096785 A1 Apr. 16, 2009

(30) Foreign Application Priority Data  
Dec. 10, 2004 (DE) .......................... 10 2004 062 361

(51) Int. Cl.  
*G06T 15/10* (2006.01)

(52) U.S. Cl. ........ 345/421; 345/419; 345/420; 345/422; 345/423; 345/474; 345/475; 345/958; 345/441; 345/442; 700/182

(58) Field of Classification Search .......... 345/418–421, 345/441, 442, 958, 422, 423, 473–475; 362/612, 362/800  
See application file for complete search history.

(56) References Cited

U.S. PATENT DOCUMENTS 4,785,399 A * 11/1988 Evans et al. .................... 715/810  
4,901,252 A * 2/1990 Fitzgerald et al. ............ 345/421  
(Continued)

FOREIGN PATENT DOCUMENTS  
EP 0167880 1/1986

OTHER PUBLICATIONS

Wei-I Hsu et al., "An Algorithm for the General Solution of Hidden Line Removal for Intersecting Solids", Computers & Graphics, Pergamon Press, 15(1991) No. 1, pp. 67-86.

(Continued)

*Primary Examiner* — Kimbinh T Nguyen  
(74) *Attorney, Agent, or Firm* — Shlesinger Arkwright & Garvey LLP

(57) ABSTRACT

The invention relates to a method and a computer-aided modelling system for creating a technical drawing from at least two modelled 3D bodies that collide with one another. In a first step, one or more of the regions of the 3D bodies that are affected by the collision are selected. In a second step, a group of colliding faces of the selected regions of the two or more 3D bodies are combined to form a respective collision group and a technical drawing of the two or more colliding modelled 3D bodies is produced. A 2D edge or its associated boundary of a face that belongs to a collision group is treated by masking the other faces that are associated with the same collision group.

36 Claims, 6 Drawing Sheets

U.S. PATENT DOCUMENTS

| | | | | |
|---|---|---|---|---|
| 5,377,118 A * | 12/1994 | Leon et al. | ............... | 700/182 |
| 5,497,453 A * | 3/1996 | Megahed et al. | ............ | 345/422 |
| 5,586,230 A * | 12/1996 | Leon et al. | ............... | 345/420 |
| 5,644,688 A * | 7/1997 | Leon et al. | ............... | 345/420 |
| 6,603,474 B1 * | 8/2003 | Cobb et al. | ............... | 345/421 |
| 6,629,065 B1 * | 9/2003 | Gadh et al. | ............ | 703/1 |
| 6,704,694 B1 * | 3/2004 | Basdogan et al. | ............ | 703/4 |
| 6,792,398 B1 * | 9/2004 | Handley et al. | ............ | 703/2 |
| 6,879,946 B2 * | 4/2005 | Rong et al. | ............ | 703/2 |
| 7,747,305 B2 * | 6/2010 | Dean et al. | ............... | 600/407 |

OTHER PUBLICATIONS

Kai Poutrain et al., "Dual Brep-CSG collision detection for general polyhedra", 2001 IEEE, pp. 124-133.

Alfred Iwainsky et al., "Lexikon der Computergrafik und Bildverarbeitung", Vieweg Verlagsgesellschaft, 1994, pp. 17, 209, 224, 289, 290.

* cited by examiner

METHOD FOR PRODUCING TECHNICAL DRAWINGS FROM 3D MODELS WITH AT LEAST TWO COLLIDING 3D BODIES

TECHNICAL FIELD

The present disclosure relates to a method and a corresponding computer aided modelling system for producing technical drawings of 3D models with at least two 3D bodies that collide with one another. Furthermore, the present disclosure includes a corresponding computer program and a computer program product.

DESCRIPTION OF THE RELATED ART

Computer aided geometric modelling is generally concerned with the construction, manipulation and pictorial representation of three-dimensional geometrical objects for applications such as construction, design, production, display, photorealistic graphics and also special effects in films.

3D CAD (computer aided design) systems have allowed a three-dimensional description of 3D bodies to be generated instead of two-dimensional drawings. As a result, a computer can not only generate any desired two-dimensional views but also make the data usable directly for the digital simulation/analysis of the constructed objects. Simulation data obtained in this way can be used, for example, in digitally controlled production machines which produce a desired 3D object therefrom. The generation of 3D bodies using a CAD system is also referred to as solid modelling. In many cases, it is currently still conventional and necessary to generate from given 3D models technical drawings, i.e. 2D models or 2D model views, which are used, for example, in the production of the 3D objects. In the 3D modelling of modules (groups consisting of a plurality of 3D bodies), colliding, i.e. interpenetrating, 3D objects or 3D bodies can occur as a result of inaccuracies in the construction or else intentionally.

The term "a collision", such as it is used hereinafter, refers to the fact that two 3D bodies collide if their intersection has a positive volume. A quantity of 3D bodies are said to collide if at least two of these 3D bodies collide with one another.

There are various methods for representing 3D bodies using a 3D CAD system. The best known of these methods is almost certainly what is known as the BRep method (boundary representation method). In this method, a 3D body is described substantially by its oriented faces.

The description of a BRep model requires geometrical and topological elements. Geometrical elements are in this case objects provided by an analytical description. Geometrical elements in solid modelling are points, curves and surfaces. Topological elements link together the geometrical data or geometrical and topological data. Typical topological elements required for describing a BRep model are in this case vertices, edges and faces. For improved model structuring, coedges, loops and shells are also used. Some topological elements, such as for example edges and faces, restrict the range of definition of a geometrical object. Topological and geometrical elements allow 3D bodies to be represented clearly.

To improve understanding, geometrical and topological elements will briefly be described hereinafter.

Points are 3D objects which are typically described by their x, y and z coordinates.

Curves are 3D objects which are represented in parameter form. Simple analytical curves include, for example, straight lines, circles, ellipses, etc. Complex curves ("free-form curves") are represented, for example, by (rational) spline curves.

Surfaces are 3D objects which have a well-defined orientation and are generally provided in parameter form. Surfaces are, for example, simple analytical faces such as a plane, cylinder, cone, sphere, torus, etc.; complex surfaces ("free-form surfaces") are generally represented by what are known as (rational) spline surfaces. Some 3D modellers describe simple analytical surfaces also by implicit equations. An implicit description of a cylinder is provided, for example, by $x^2+y^2=1$.

The curves and surfaces used in BRep representation generally have smooth (i.e. at least continuously differentiable) and uniform parameterisations. Even singularities are in this case allowed at boundary points.

Vertices are geometrically described by points. Vertices always belong to an edge.

Edges are geometrically described by curves delimited by a start and an end vertex, respectively. Thus, for example, a straight edge between two points A and B is represented by a straight line and by the additional specification of the start point A and the end point B. A and B are in this case the vertices of the edge. Edges have the same orientation as or the opposite orientation to their describing curves.

A coedge is described by an edge located on a surface. The orientation/direction of passage of the coedge can differ from the orientation/direction of passage of the edge. Coedges always belong to a loop.

Loops are closed "curve paths", consisting of one or more coedges, all of which have the same direction of passage. The start vertex of the first coedge corresponds to the end vertex of the last coedge; each vertex of a loop has precisely two adjacent coedges. Loops always belong to a face.

Faces are geometrically represented by orientable surfaces together with their delimiting coedges. Faces have the same orientation as or the opposite orientation to their describing surfaces. The orientation is defined by what is known as the right-hand screw rule, i.e. an enclosed surface region is located in the direction of bypass to the left of its coedges. A face can be bordered by one or more loops (face with or without "holes"). Faces are coherent surface parts. They always belong to a shell.

Shells are coherent volumes in 3D generally described by a plurality of faces having a consistent surface orientation. This means that all surface normals point either into the "inside" or into the "outside" of the shell. Shells are generally closed topological two-dimensional manifolds; these will be referred to hereinafter as manifold shells. In particular, each edge of a manifold shell is located on precisely two faces.

3D bodies can consist of one or more shells. All faces, edges and vertices arising on a 3D body can be addressed directly. A 3D body is described completely by its bordering surfaces.

Manifold bodies are 3D bodies which are bordered by one or more manifold shells. Self-penetrating faces, edges and shells are not admissible in the modelling of manifold bodies.

BRep models are defined by one or more delimiting elements or shells. BRep representation is an intuitive and practical method for representing real 3D bodies within a CAD system.

Manifold BRep models are BRep models constructed from one or more manifold bodies. Most 3D bodies occurring in application (mould making, machine construction, design, etc.) can be represented as a computer model in this way via their delimiting elements.

Volume models allow a broad range of evaluations. A volume modeller can thus provide algorithms for determining the volume, surface area, centre of gravity or mass moment of inertia of a 3D body. Other methods carry out geometrical position tests between a 3D body and other geometrical objects.

The term "derivation of technical drawings or a layout calculation from one or more predetermined manifold bodies" refers to the generation of a 2D model of these 3D bodies using parallel or central projection into a predetermined projection plane. In this case, the 2D rims, generated by projection, of a concealed edge are, to put it simply, classified as being "invisible"; otherwise, a 2D rim is "visible". A more detailed explanation will be provided below.

The term "parallel projection" refers in this case to a projection of corresponding 3D elements orthogonally to the projection plane and "central projection" refers to the projection of the 3D elements from a specific point, known as the eye point, outside the projection plane into the projection plane. The parallel projection most commonly used in application in solid modelling is a special case of central projection, wherein it can be imagined that the eye point is in this case located in the infinite.

Starting from a BRep representation of one or more 3D bodies, the layout is calculated in the following steps:

1. Calculation and impressing of silhouette edges into the corresponding faces. A surface point P is a silhouette point if, in the case of parallel projection, the surface normal N(P) belonging to the point P is located perpendicularly to the direction of projection V. In central projection, the connecting vector between the eye point E and surface point P is located perpendicularly to the surface normal N(P). The impressing of the silhouettes causes the faces generally to break down into a plurality of face parts. Each face part of this type has the property that in the case of parallel projection, for all of the inner points P with their associated surface normals N(P) of this face part, consistently either $<V, N(P)>>0$ or $<V, N(P)><0$ applies. $<.,.>$ denotes in this case the standard Euclidean scalar product in 3D.

Face parts having the property $<V, N>>0$ for all inner surface normals N are called front faces and face parts having the property $<V, N><0$ for all inner surface normals N are called back faces.

The same applies to central projection.

2. Projection of all given 3D body edges (optionally separated by silhouette curves) including the silhouette curves into the projection plane. The projected 2D curves are then cut and optionally separated from one another.

A consequence of the first two steps is that all generated and optionally separated 2D rims have, under specific conditions to be described in greater detail hereinafter, clear visibility. A 2D rim is in this case visible if the corresponding portion of the associated (3D) edge is visible, i.e. if a sight ray issuing from an inner point of the edge portion in the direction of the eye point strikes or intersects the 3D model at no further point on the face. The 2D rim is invisible if the corresponding portion of the associated (3D) edge is invisible.

3. Determining the visibility using what is known as a sight ray method. For each 2D rim, the centre point is first determined and the associated 3D point Q on the associated edge located closest to the eye point is then established. A sight ray issuing from the test point Q to the eye point is then constructed and the 2D rim is classified as being visible if this sight ray strikes or intersects no further point on the face of the 3D model. Otherwise, the 2D rim is invisible.

The calculation of the layout for complex 3D models can be accelerated by a large number of algorithmic optimisations such as, for example, the following:

For determining visibility, it is sufficient to observe only the front faces.

An edge located on two back faces is never visible.

In order to keep the resulting layout during the projection and cutting step small, "unnecessary" separation of 2D rims is avoided wherever possible. Thus, for example, the projection of an edge located on two front faces never contributes to the separation of a further 2D rim.

The determining, which is generally relatively expensive, of the visibility of a 2D rim using the described sight ray method can be optimised by rapid "visibility propagation" rules.

The clear visibility of all generated and optionally separated 2D rims and the above-mentioned optimisations are correct and possible if and only if the given model consists of one or more manifold bodies which do not collide with one another. Otherwise, the described determining of the visibility of 2D rims will generally lead to false visibility classifications, and the visibility propagation rules can then—as a consequence—lead to a large number of falsely classified 2D rims. Thus, for example, in the case of two colliding 3D bodies, there can be edges of a 3D body that, on account of the collisions, "penetrate" the other 3D body and therefore have both a visible and an invisible region. It is obviously generally not possible clearly to determine the visibility of edges of this type. If an edge of this type or its 2D projection is, for example, classified as being visible/invisible (and this is just as wrong as classifying it as being invisible/visible), this can lead, as a result of algorithm optimisations, for example visibility propagation rules, to a large number of 2D rims being erroneously classified as being visible/invisible.

The above-described standard method for determining a technical drawing based on manifold BRep models is what is known as a hidden-line algorithm. The various configurations of this standard method differ substantially in terms of a differing representation of geometrical and topological elements and in terms of the interplay of the possible algorithm optimisations. Thus, for example, analytical or graphical model representations are possible which differ substantially in terms of their geometrical representation.

SUMMARY

Starting from the described prior art and the problems associated therewith, the present disclosure proposes, for the calculation or production of technical drawings of at least two colliding modelled 3D bodies, a new approach to determining visibility at a face/face level.

According to one aspect a method is provided for deriving a technical drawing of colliding manifold bodies, which method allows representation errors in overlapping or colliding 3D bodies to be avoided or minimised. Furthermore, a computer aided modelling system is disclosed.

The method according to one aspect is especially suitable for the treatment of what are known as microcollisions, i.e. of collisions, the collision intersection of which has a very small volume.

There is proposed a method for deriving a technical drawing of at least two manifold bodies or 3D bodies that collide with one another, one or more of the regions of the colliding 3D bodies that are affected by the collision firstly being selectively determined and marked. Colliding faces of the selectively determined regions of the at least two 3D bodies are then grouped to form a respective collision group. A technical drawing of the at least two 3D bodies that collide with one another is then derived, a 2D rim or its associated edge of a face that belongs to a collision group being treated by masking the other faces that are associated with the same collision group.

The modelled 3D bodies can in this case be generated, for example, using a BRep modeller described at the outset.

In a further possible embodiment of the method according to another aspect, an edge of a face that belongs to a collision group is treated, with regard to the visibility of the edge, by masking the other faces that are associated with the same collision group. This is carried out, for example, in such a way that individual algorithm optimisations are selectively restricted during the layout calculation for regions of the 3D bodies that are affected by the collision and are therefore determined and marked accordingly; thus, for example, visibility propagation rules are not used in these 3D bodies or in the correspondingly marked regions.

After the projection and cutting step described at the outset or immediately before the calculation, also described at the outset, of the visibility of the 2D rims, there are determined for the marked colliding pairs of 3D bodies, in this case denoted for example as (K1, K2), all associated colliding pairs, in this case denoted for example as (F1, F2), of faces, wherein F1 belongs to the first 3D body K1 and F2 to the second 3D body K2. The actual determining of the visibility of a 2D rim, of which the edge e closest to the eye point belongs to a marked colliding 3D body K and of which the edge e belongs to a face F which is referenced in at least one of the colliding pairs of faces, then proceeds, for example, in accordance with the following central rule:

The 2D rim or its associated edge is classified as being visible precisely at the moment when the sight ray for determining the visibility of this 2D rim strikes no further point of the overall 3D model, all faces Fi of 3D bodies which differ from the 3D body K and collide with F being disregarded or masked in the visibility test.

Otherwise, the 2D rim is invisible. For determining visibility, it is sufficient to observe merely the front faces. This procedure leads to clear visibility classifications which are independent of the test sequence even for 2D rims, the associated edges of which are involved in collisions. All other 2D rims are classified using the above-described standard sight ray method.

The described method for the treatment of collisions has an effect merely in an environment of the colliding faces. Micro-collisions will therefore have merely a very local effect, i.e. the 2D rims affected by the collision are clearly classified and the remaining collision-free portion of the technical drawing remains unaffected by the special treatment. In micro-collisions, it may generally be said that the technical drawing for two micro-colliding 3D bodies differs only slightly from a corresponding collision-free situation involving two 3D bodies in contact with one another.

There is also provided a computer aided modelling system for creating a two-dimensional drawing of at least two modelled manifold bodies or 3D bodies that collide with one another using an input unit for inputting commands and data for generating and modifying the two 3D bodies that collide with one another, a modelling unit for calculating the two 3D bodies that collide with one another, a functional unit for determining regions of the at least two 3D bodies that are affected by a collision, a grouping unit for grouping colliding faces of the regions affected by the collision to form a collision group, a projection unit for calculating a technical drawing and a selection unit for selectively masking individual colliding faces that belong to a collision group.

In addition, in another aspect a computer program is provided, the computer program having a program code for carrying out all of the steps of a method described before when the computer program is executed on a computer or a corresponding computational means.

The present disclosure also relates to a computer program product having a program code stored on a computer-readable data carrier for carrying out a method described before when the computer program is executed on a computer or a corresponding computational means.

Further advantages and embodiments will emerge from the description and the accompanying drawings.

Obviously, the features mentioned above and those to be described hereinafter can be used not only in the respectively specified combination but rather also in other combinations or in isolation without thereby departing from the scope of the present disclosure.

BRIEF DESCRIPTION OF THE DRAWINGS

The following three diagrams show the typical BRep elements known in the art. In these drawings:
FIG. 3 is a typical view of a face F.
Some implementations will now be illustrated schematically based on an embodiment in the following drawings and described in detail with reference to these drawings, in which.

DETAILED DESCRIPTION OF THE DRAWINGS

Figure 1:
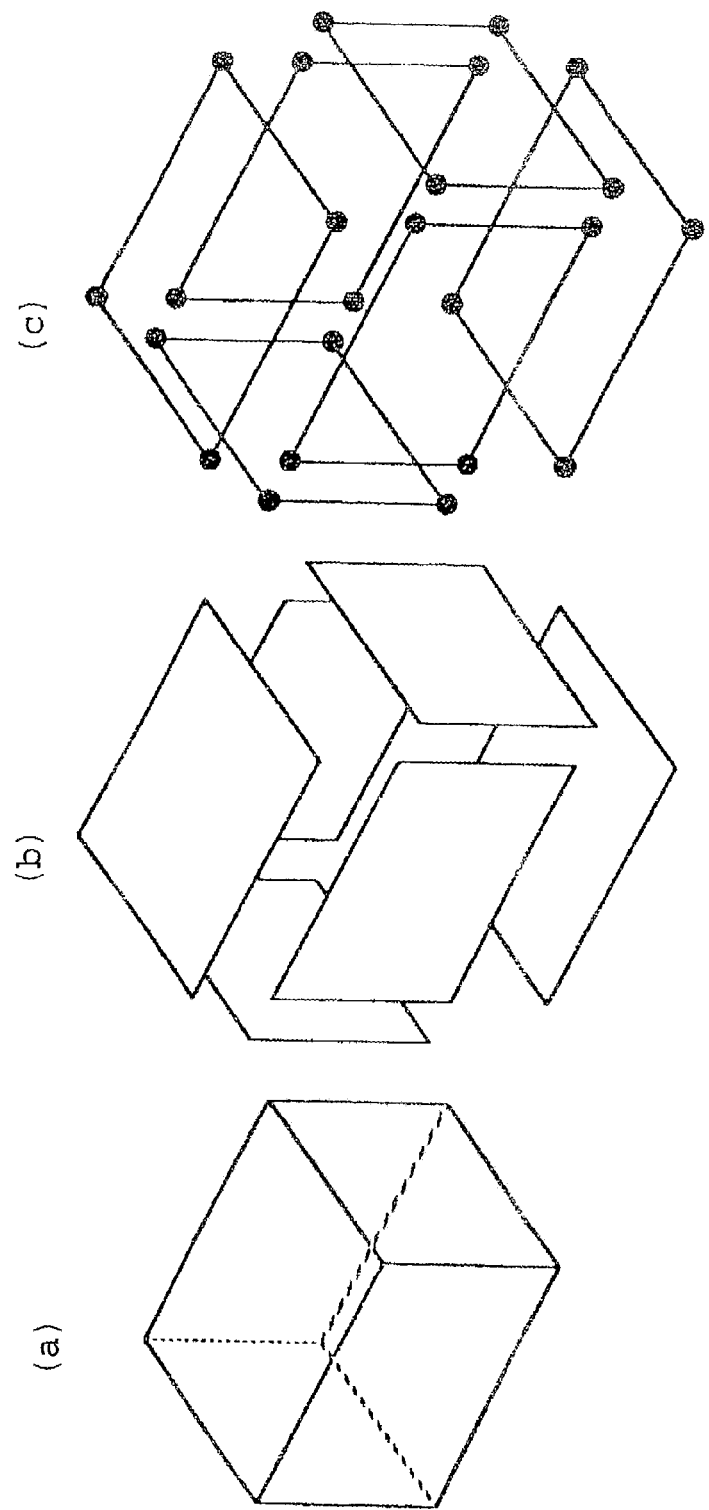
FIG. 1 is a crude illustration of a BRep model based on a cube.

FIG. 1 is a crude illustration of a BRep model based on a cube. Part (a) of FIG. 1 is a sketch of a cube. (b) sketches the faces of the cube and (c) the vertices and edges required for description.

Figure 2:
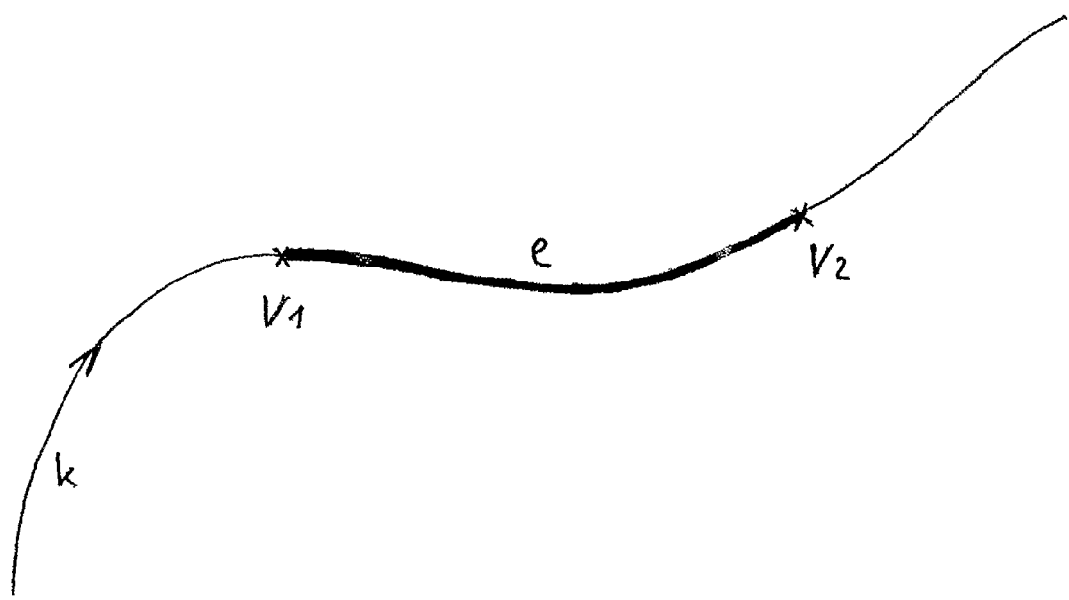
FIG. 2 is a possible view of an edge.

FIG. 2 is a typical view of an edge e. The edge e is defined in this case via a curve k. A corresponding direction of passage is also indicated for the curve k defining the edge e. In addition, both an associated (start) vertex V1 and an associated (end) vertex V2 of the edge e are marked.

Figure 3:
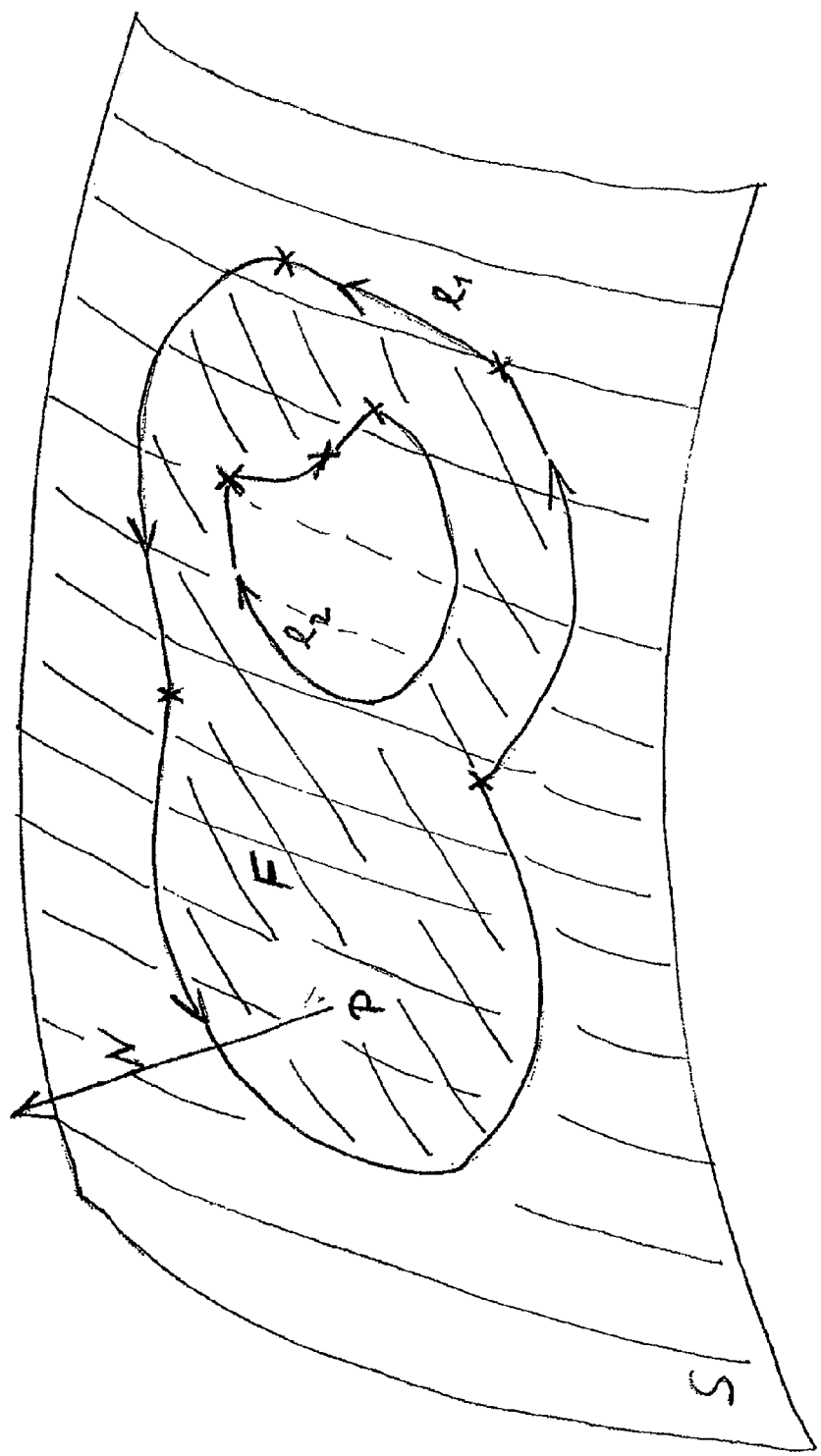

FIG. 3 is a typical view of a face F. The face F is shown in this case with the (oriented) surface S defining it. Also shown are two loops $l_1$ and $l_2$ delimiting the face F. The outer loop $l_1$ is oriented anticlockwise. The inner loop, on the other hand, is oriented clockwise and borders a "hole" in the face F. A surface normal N associated with the face F is indicated at a point P on the face F.

Figure 4:
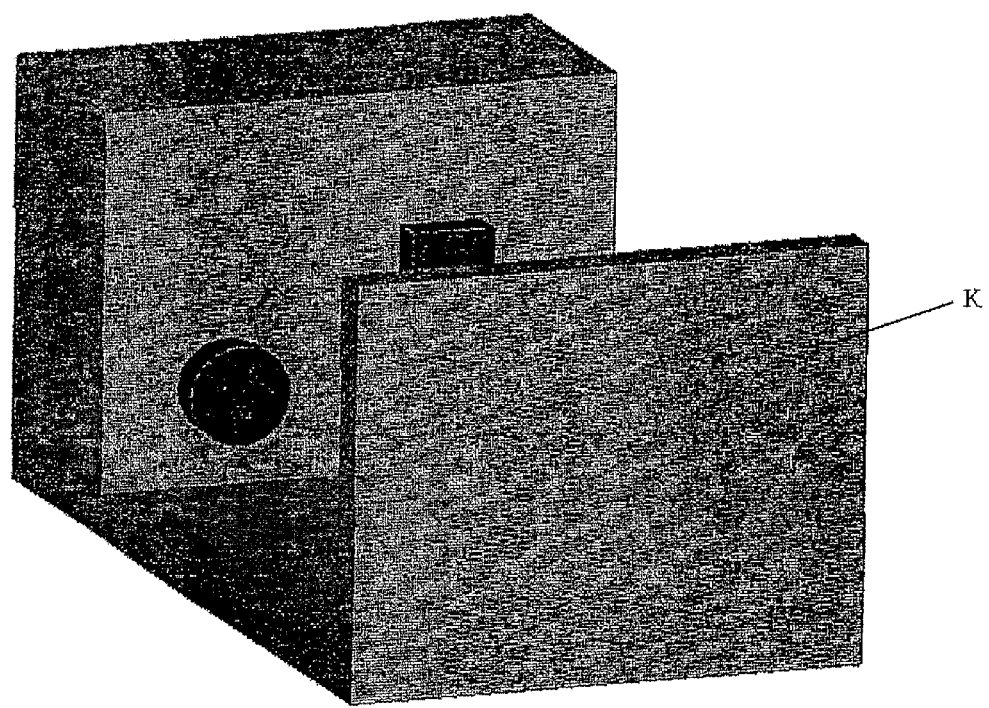
FIG. 4 shows a possible arrangement of three simple bodies that collide with one another.

FIG. 4 shows a possible arrangement of three 3D bodies that collide with one another, with reference to which the following figure illustrates a possible embodiment of the proposed method. A cylinder, a cuboid and a general body K are shown. The body K collides with the cylinder and with the cuboid. The majority of the cylinder and the cuboid is covered by the body K.

Figure 5:
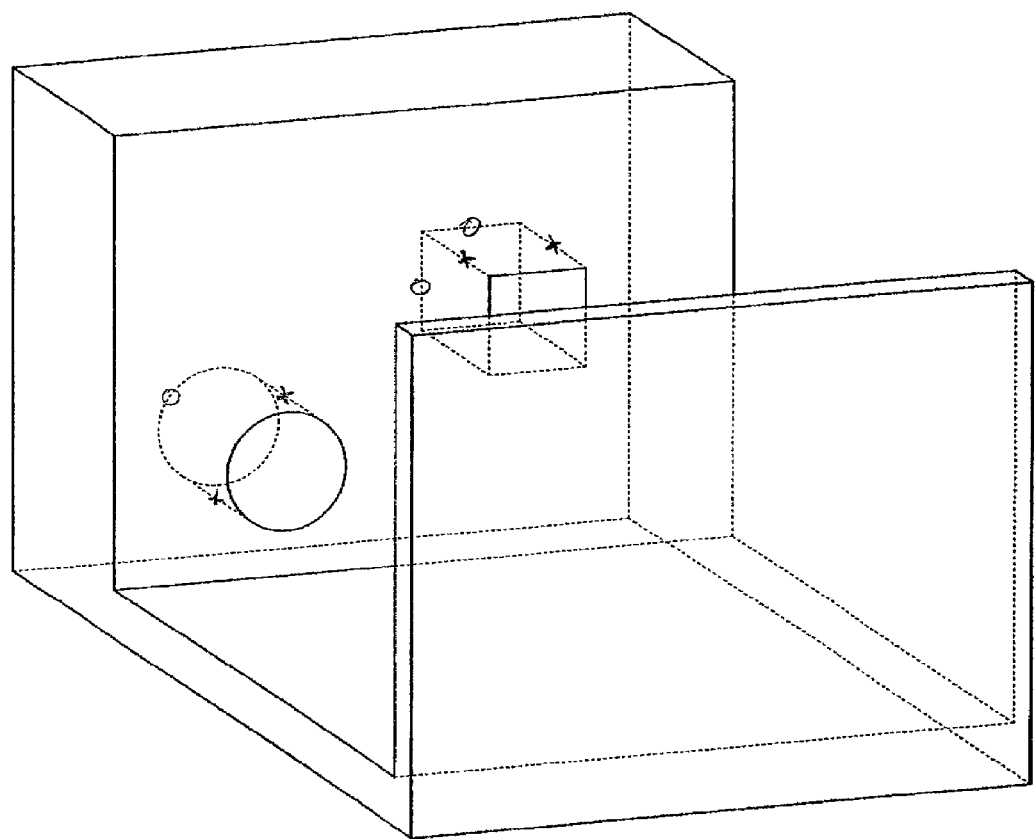
FIG. 5 shows the result of a layout calculation carried out using a standard method without special treatment of colliding faces.

FIG. 5 shows the result of a calculation carried out of the layout of the arrangement sketched in FIG. 4 using a standard method without special treatment of colliding faces. Algorithm optimisations such as, for example, visibility propagation rules were not used in this case. The edges denoted or marked by "x" of the cylinder and cuboid are partially visible and partially concealed. This means that their visibility is not clearly classifiable. The previously described sight ray method, which is based on parallel projection, classifies the 2D rims marked with "x" as being invisible, as the majority of the associated 3D edges is concealed.

This result changes abruptly if the spatial position of the cylinder and cuboid is changed out of the body K by simple displacement of these bodies toward the cylinder axis, the collisions being maintained. The 2D rims marked with "x" become visible as soon as the majority of the edges is no longer concealed by the body K.

In FIG. 5, the 2D rims marked with an "o" are correctly classified. However, in such situations, the application of visibility propagation rules would lead to unpredictable visibility results.

Figure 6:
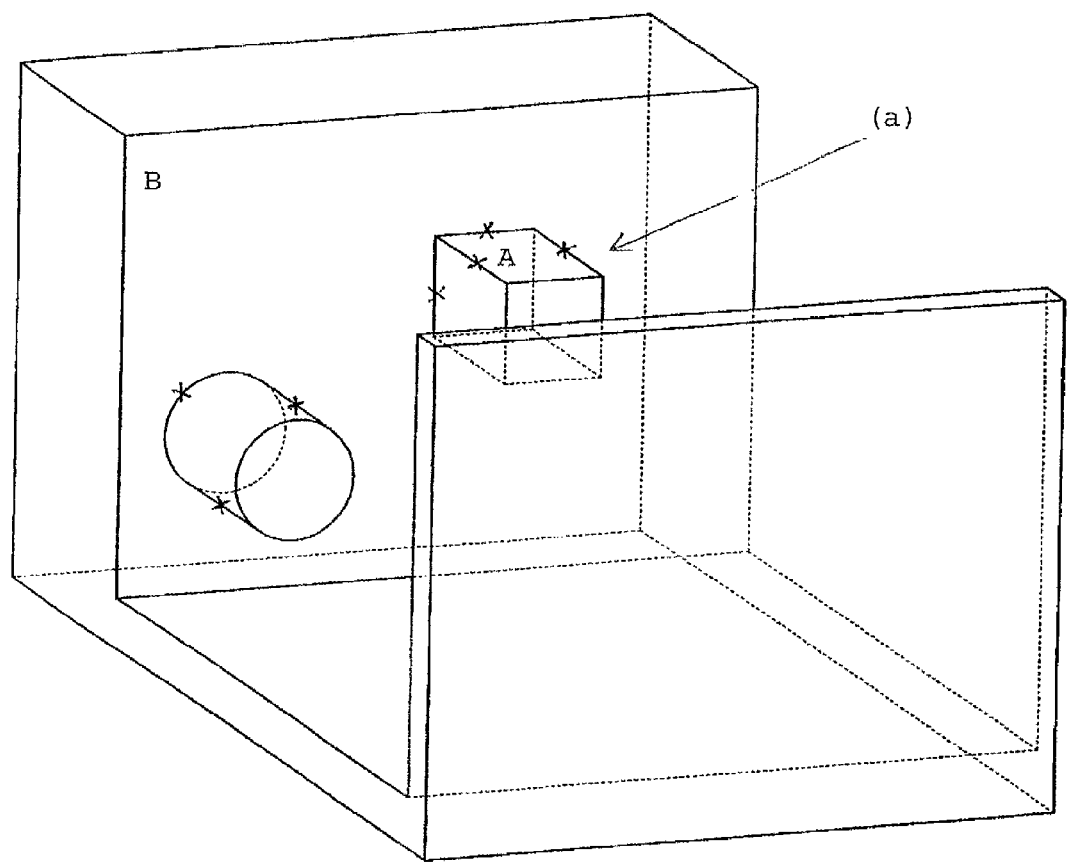
FIG. 6 shows the result of the production of a technical drawing according to an embodiment of the proposed method.

FIG. 6 shows a result of the production of a technical drawing of the colliding 3D bodies sketched in FIG. 4 according to a possible embodiment of the proposed method. This procedure or the collision approach is based in this case at face/face level. The visibility of the 2D rims marked with "x" is clearly determined in this case. The face A of the cuboid and the face B of the body K collide with one another. As a result thereof the face A and the face B are grouped to form a collision group. Thus, for example, the 2D rim (a) is visible because it is located on the face A which collides with the face B; in addition, the associated edge is concealed by no further non-colliding face. The sight ray method ignores in this case the face B in the visibility test and thus provides a clear visibility decision for the 2D rim (a); the same applies to all other 2D rims marked with (x). The 2D rims marked with (x) remain visible even if the spatial position of the cylinder and cuboid is changed out of the body K or into the body K by simple displacement of these bodies toward the cylinder axis, the collisions being maintained.

What is claimed:

1. Method implemented by a computer aided modelling system for creating a technical drawing of at least two 3D bodies that collide with one another, the technical drawing being used in the production of corresponding 3D objects, said method comprising the steps of:
   a) selectively determining one or more of the regions of the at least two 3D bodies that are affected by the collision;
   b) grouping of colliding faces of the selectively determined regions of the at least two 3D bodies to form a respective collision group; and
   c) generating a 2D model as the technical drawing of the at least two colliding modelled 3D bodies using parallel or central projection into a predetermined projection plane, wherein a 2D rim or its associated edge of a face that belongs to a collision group is treated with regard to visibility by masking the other faces that are associated with the same collision group.

2. Method according to claim 1, wherein an edge of a face that belongs to a collision group is treated, with regard to the visibility of the edge, by masking the other faces that are associated with the same collision group.

3. Method according to claim 1, wherein the modelled bodies are generated using a BRep modeller.

4. Method according to claim 2, wherein the modelled bodies are generated using a BRep modeller.

5. Method according to claim 1, wherein micro-collision regions are chosen as regions of the at least two 3D bodies that are affected by the collision.

6. Method according to claim 2, wherein micro-collision regions are chosen as regions of the at least two 3D bodies that are affected by the collision.

7. Method according to claim 3, wherein micro-collision regions are chosen as regions of the at least two 3D bodies that are affected by the collision.

8. Method according to claim 4, wherein micro-collision regions are chosen as regions of the at least two 3D bodies that are affected by the collision.

9. Computer aided modelling system for creating a technical drawing of at least two 3D bodies that collide with one another, the technical drawing being used in the production of corresponding 3D objects, the system comprising:
   a) an input unit for inputting commands and data for generating and modifying the two 3D bodies that collide with one another;
   b) a modelling unit for calculating the two 3D bodies that collide with one another;
   c) a functional unit for determining regions of the at least two 3D bodies that are affected by a collision;
   d) a grouping unit for grouping colliding faces of the regions affected by the collision to form a collision group;
   e) a projection unit for creating a technical drawing; and
   f) a selection unit for masking, when producing a drawing, individual colliding faces that belong to a collision group.

10. Computer aided modelling system according to claim 9, wherein the modelling unit is a BRep modeller.

11. A computer aided modelling system for creating a technical drawing of at least two 3D bodies that collide with one another, the technical drawing being used in the production of corresponding 3D objects, said system including a program comprising the steps of:
   a) selectively determining one or more of the regions of the at least two 3D bodies that are affected by the collision;
   b) grouping of colliding faces of the selectively determined regions of the at least two 3D bodies to form a respective collision group; and
   c) generating a 2D model as the technical drawing of the at least two colliding modelled 3D bodies using parallel or central projection into a predetermined projection plane, wherein a 2D rim or its associated edge of a face that belongs to a collision group is treated with regard to visibility by masking the other faces that are associated with the same collision group.

12. A computer aided modelling system according to claim 11, wherein an edge of a face that belongs to a collision group is treated, with regard to the visibility of the edge, by masking the other faces that are associated with the same collision group.

13. A computer aided modelling system according to claim 11, wherein the modelled bodies are generated using a BRep modeller.

14. A computer aided modelling system according to claim 12, wherein the modelled bodies are generated using a BRep modeller.

15. A computer aided modelling system according to claim 11, wherein micro-collision regions are chosen as regions of the at least two 3D bodies that are affected by the collision.

16. A computer aided modelling system according to claim 12, wherein micro-collision regions are chosen as regions of the at least two 3D bodies that are affected by the collision.

17. A computer aided modelling system according to claim 13, wherein micro-collision regions are chosen as regions of the at least two 3D bodies that are affected by the collision.

18. A computer aided modelling system according to claim 14, wherein micro-collision regions are chosen as regions of the at least two 3D bodies that are affected by the collision.

19. Method implemented by a computer aided modelling system for creating a technical drawing of at least two 3D bodies of a 3D model that collide with one another, the technical drawing being used in the production of corresponding 3D objects, said method comprising the steps of:
a) selectively determining one or more of the regions of the at least two 3D bodies that are affected by the collision;
b) grouping of colliding faces of the selectively determined regions of the at least two 3D bodies to form a respective collision group;
c) generating a 2D model as the technical drawing of the at least two colliding modelled 3D bodies using parallel or central projection into a predetermined projection plane, wherein a 2D rim or its associated edge of a face that belongs to a collision group is treated with regard to visibility by masking the other faces that are associated with the same collision group; and
e) classifying the 2D rim or its associated edge as being visible precisely at the moment when the sight ray for determining the visibility of this 2D rim strikes no further point of the overall 3D model.

20. Method according to claim 19, wherein an edge of a face that belongs to a collision group is treated, with regard to the visibility of the edge, by masking the other faces that are associated with the same collision group.

21. Method according to claim 19, wherein the modelled bodies are generated using a BRep modeller.

22. Method according to claim 20, wherein the modelled bodies are generated using a BRep modeller.

23. Method according to claim 19, wherein micro-collision regions are chosen as regions of the at least two 3D bodies that are affected by the collision.

24. Method according to claim 20, wherein micro-collision regions are chosen as regions of the at least two 3D bodies that are affected by the collision.

25. Method according to claim 21, wherein micro-collision regions are chosen as regions of the at least two 3D bodies that are affected by the collision.

26. Method according to claim 22, wherein micro-collision regions are chosen as regions of the at least two 3D bodies that are affected by the collision.

27. Computer aided modelling system for creating a technical drawing of at least two 3D bodies of a 3D model that collide with one another, the technical drawing being used in the production of corresponding 3D objects, the system comprising:
a) an input unit for inputting commands and data for generating and modifying the two 3D bodies that collide with one another;
b) a modelling unit for calculating the two 3D bodies that collide with one another;
c) a functional unit for determining regions of the at least two 3D bodies that are affected by a collision;
d) a grouping unit for grouping colliding faces of the regions affected by the collision to form, a collision group;
e) a generation unit for generating a 2D model as the technical drawing of the at least two colliding modelled 3D bodies using parallel or central projection into a predetermined projection plane, wherein a 2D rim or its associated edge of a face that belongs to a collision group is treated with regard to visibility by masking the other faces that are associated with the same collision group;
f) a classification unit for classifying the 2D rim or its associated edge as being visible precisely at the moment when the sight ray for determining the visibility of this 2D rim strikes no further point of the overall 3D model;
g) a projection unit for creating a technical drawing; and
h) a selection unit for masking, when producing a drawing, individual colliding faces that belong to a collision group.

28. Computer aided modelling system according to claim 27, wherein the modelling unit is a BRep modeller.

29. A computer aided modelling system for creating a technical drawing of at least two 3D bodies of a 3D model that collide with one another, the technical drawing being used in the production of corresponding 3D objects, said system including a program comprising the steps of:
a) selectively determining one or more of the regions of the at least two 3D bodies that are affected by the collision;
b) grouping of colliding faces of the selectively determined regions of the at least two 3D bodies to form a respective collision group;
c) generating a 2D model as the technical drawing of the at least two colliding modelled 3D bodies using parallel or central projection into a predetermined projection plane, wherein a 2D rim or its associated edge of a face that belongs to a collision group is treated with regard to visibility by masking the other faces that are associated with the same collision group; and
d) classifying the 2D rim or its associated edge as being visible precisely at the moment when the sight ray for determining the visibility of this 2D rim strikes no further point of the overall 3D model.

30. A computer aided modelling system according to claim 29, wherein an edge of a face that belongs to a collision group is treated, with regard to the visibility of the edge, by masking the other faces that are associated with the same collision group.

31. A computer aided modelling system according to claim 29, wherein the modelled bodies are generated using a BRep modeller.

32. A computer aided modelling system according to claim 30, wherein the modelled bodies are generated using a BRep modeller.

33. A computer aided modelling system according to claim 29, wherein micro-collision regions are chosen as regions of the at least two 3D bodies that are affected by the collision.

34. A computer aided modelling system aided modelling system according to claim 30, wherein micro-collision regions are chosen as regions of the at least two 3D bodies that are affected by the collision.

35. A computer aided modelling system according to claim 31, wherein micro-collision regions are chosen as regions of the at least two 3D bodies that are affected by the collision.

36. A computer aided modelling system according to claim 32, wherein micro-collision regions are chosen as regions of the at least two 3D bodies that are affected by the collision.

* * * * *